(12) United States Patent
Callaway et al.

(10) Patent No.: US 8,600,621 B2
(45) Date of Patent: Dec. 3, 2013

(54) SYSTEM AND METHOD FOR CONTROLLING SLIP

(75) Inventors: Joshua Callaway, Cary, NC (US); Todd R. Farmer, Dana Point, CA (US)

(73) Assignee: Caterpillar Inc., Peoria, IL (US)

( * ) Notice: Subject to any disclaimer, the term of this patent is extended or adjusted under 35 U.S.C. 154(b) by 34 days.

(21) Appl. No.: 13/332,005

(22) Filed: Dec. 20, 2011

(65) Prior Publication Data
US 2013/0158804 A1  Jun. 20, 2013

(51) Int. Cl.
*A01B 63/12* (2006.01)

(52) U.S. Cl.
USPC .......................................... 701/41

(58) Field of Classification Search
USPC .......................................... 701/41
See application file for complete search history.

(56) References Cited

U.S. PATENT DOCUMENTS

| | | |
|---|---|---|
| 3,497,014 A | 2/1970 | Ask |
| 3,896,899 A | 7/1975 | Scholl |
| 3,913,680 A | 10/1975 | Carlson |
| 4,431,060 A | 2/1984 | Scholl et al. |
| 4,630,685 A | 12/1986 | Huck, Jr. et al. |
| 4,807,131 A | 2/1989 | Clegg |
| 4,866,623 A | 9/1989 | Ise et al. |
| 5,040,119 A | 8/1991 | Hardy et al. |
| 5,190,111 A | 3/1993 | Young et al. |
| 5,287,280 A | 2/1994 | Yamamoto et al. |
| 5,424,623 A | 6/1995 | Allen et al. |
| 5,493,798 A | 2/1996 | Rocke et al. |
| 5,699,248 A | 12/1997 | Nakagami et al. |
| 5,860,480 A * | 1/1999 | Jayaraman et al. ............. 172/2 |
| 6,181,999 B1 | 1/2001 | Yamamoto et al. |
| 6,286,606 B1 | 9/2001 | Krieg et al. |
| 6,317,676 B1 | 11/2001 | Gengler et al. |
| 6,332,103 B1 * | 12/2001 | Steenson et al. .................. 701/1 |
| 6,757,994 B1 | 7/2004 | Hendron |
| 6,810,318 B2 * | 10/2004 | Brooks et al. .................... 701/82 |
| 6,845,311 B1 * | 1/2005 | Stratton et al. .................. 701/50 |
| 7,121,355 B2 | 10/2006 | Lumpkins et al. |
| 7,337,054 B2 | 2/2008 | Pandey et al. |
| 7,440,824 B2 * | 10/2008 | Chen et al. ....................... 701/1 |
| 7,590,481 B2 | 9/2009 | Lu et al. |
| 7,630,793 B2 * | 12/2009 | Thomas et al. ................ 700/275 |
| 7,677,323 B2 * | 3/2010 | Stratton et al. .................. 172/7 |
| 7,779,947 B2 * | 8/2010 | Stratton ........................ 180/197 |
| 7,894,958 B2 * | 2/2011 | Tate et al. ....................... 701/41 |
| 7,979,179 B2 * | 7/2011 | Gansler ........................... 701/38 |
| 2002/0162668 A1 | 11/2002 | Carlson et al. |
| 2008/0103638 A1 | 5/2008 | Young |
| 2008/0313935 A1 | 12/2008 | Trifunovic |
| 2011/0010005 A1 * | 1/2011 | Tan et al. ...................... 700/214 |
| 2011/0046857 A1 | 2/2011 | Farmer et al. |
| 2011/0301824 A1 * | 12/2011 | Nelson et al. ................. 701/102 |
| 2012/0158209 A1 * | 6/2012 | Doy et al. ........................ 701/1 |

* cited by examiner

*Primary Examiner* — Thomas Tarcza
*Assistant Examiner* — Alex C Dunn
(74) *Attorney, Agent, or Firm* — Leydig, Voit & Mayer

(57) ABSTRACT

A system for automated control of a ground-engaging traction device includes sensors to indicate a speed of the ground-engaging traction device, an acceleration of the machine, and a pitch rate of the machine. A controller determines a drive acceleration based upon the speed, and a ground acceleration based upon the acceleration and the pitch rate. The controller determines a command signal at least in part based upon an operator input command signal and a difference between the drive acceleration and the ground acceleration. A method is also provided.

20 Claims, 4 Drawing Sheets

SYSTEM AND METHOD FOR CONTROLLING SLIP

TECHNICAL FIELD

This disclosure relates generally to controlling the operating parameters a self-propelled work machine, and more particularly, to a system and method for controlling and optimizing track or wheel slip of the self-propelled work machine.

BACKGROUND

Self-propelled work machines such as track-driven machines as well as wheeled machines are used for a variety of tasks. These machines must be able to work efficiently over a variety of ground conditions including different types of soil and terrain. Track or wheel slip will often be encountered during various work operations. Slippage reduces fuel economy, causes excessive wear on the ground-engaging components together with the powertrain, and may reduce an operator's control of the machine.

U.S. Pat. No. 7,779,947 discloses a system for controlling slip of a machine. An accelerometer may be provided to detect vertical acceleration of the machine. When tracks of the machine slip, the machine may experience vertical acceleration that is measured by the accelerometer. Upon measuring such vertical acceleration, a power reduction signal may be generated by the controller of the machine to slow the tracks sufficiently to minimize or eliminate slip.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for automated control of a ground-engaging traction device of a machine includes a plurality of sensors. A drive sensor is configured to provide a drive signal indicative of a speed of the ground-engaging traction device. A first sensor on the machine is configured to provide an acceleration signal indicative of a measured acceleration of the machine. A second sensor on the machine is configured to provide a pitch rate signal indicative of a measured pitch rate of the machine. A controller is configured to determine a drive acceleration based upon the drive signal, and determine a ground acceleration based upon the acceleration signal and the pitch rate signal. The controller further is configured to compare the drive acceleration to the ground acceleration, determine a command signal at least in part based upon an operator input command signal and a difference between the drive acceleration and the ground acceleration, and transmit the command signal to a drive system to control the ground-engaging traction device.

In another aspect, a method for controlling a ground-engaging traction device of a machine is provided. The method includes receiving a drive signal by a controller indicative of a speed of the ground-engaging traction device, receiving an acceleration signal by the controller indicative of a measured acceleration of the machine, and receiving a pitch rate signal by the controller indicative of a measured pitch rate of the machine. A drive acceleration is determined based upon the drive signal and a ground acceleration is determined based upon the acceleration signal and the pitch rate signal. The drive acceleration is compared to the ground acceleration. A command signal is determined at least in part based upon an operator input command signal and a difference between the drive acceleration and the ground acceleration. The command signal is transmitted from the controller to a drive system to control the ground-engaging traction device.

DETAILED DESCRIPTION

Figure 1:
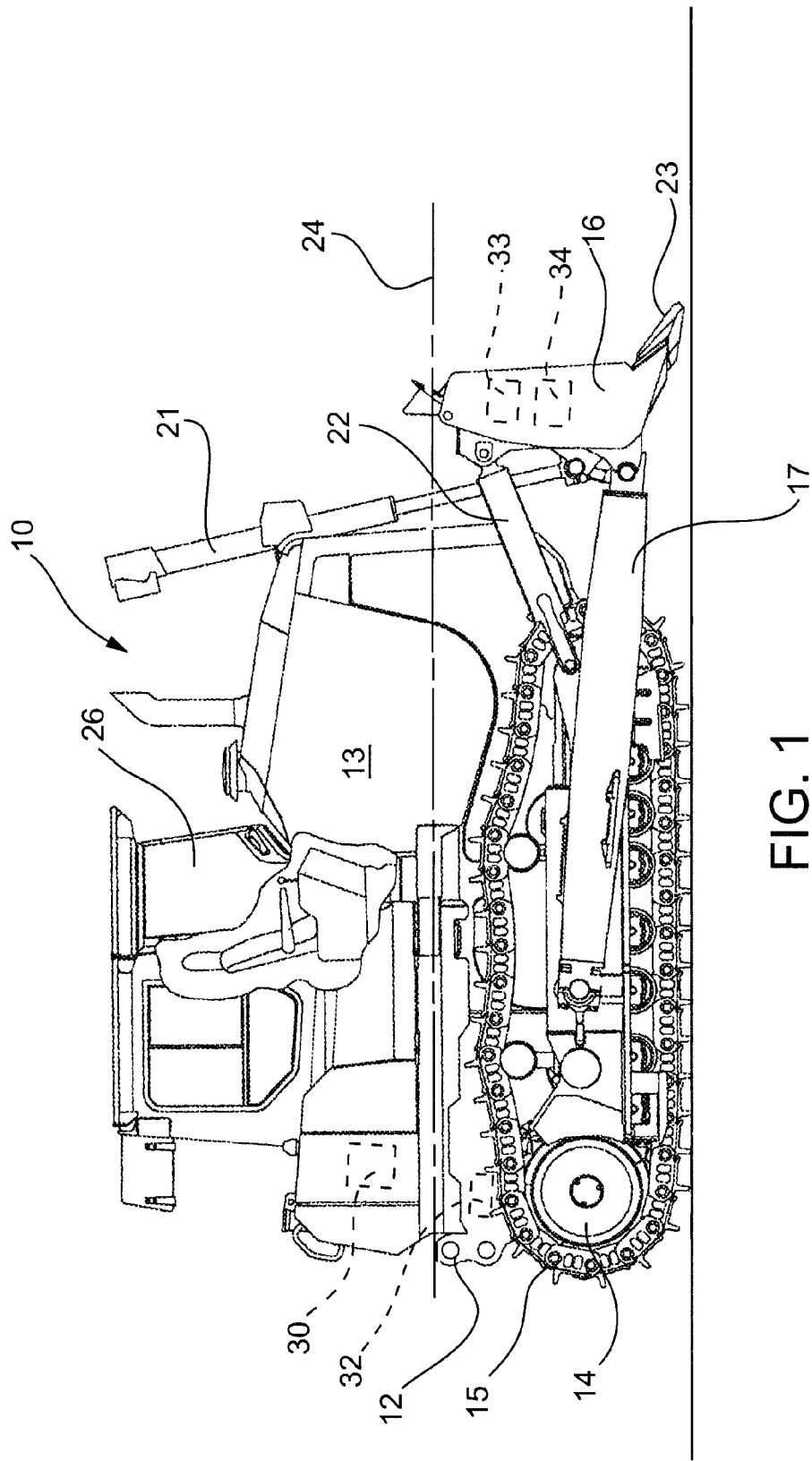
FIG. 1 shows a diagrammatic illustration of a machine in accordance with the disclosure.

FIG. 1 shows a diagrammatic illustration of a machine 10 in accordance with an embodiment of the disclosure. The machine 10 includes a frame 12 and a prime mover such as an engine 13. A ground-engaging drive mechanism such as a track 15 is driven by a drive wheel 14 on each side of machine 10 to propel the machine. Although machine 10 is shown in a "track-type" configuration, other configurations, such as a wheeled configuration, may be used. In addition, the systems and methods of the disclosure may be used with any machine propulsion and drive train mechanisms applicable in the art including hydrostatic, electric, or a mechanical drive.

Machine 10 may include a blade 16 pivotally connected to frame 12 by arms 17 on each side of machine 10. The systems and methods disclosed herein may also be used on machines other than a machine having a ground-engaging blade. First hydraulic cylinder 21 coupled to frame 12 supports blade 16 in the vertical direction, and allows blade 16 to move up or down vertically from the point of view of FIG. 1. Second hydraulic cylinders 22 on each side of machine 10 allow the pitch angle of blade tip 23 to change relative to a centerline 24 of the machine.

Machine 10 may be configured so that engine 13 drives a hydraulic pump (not shown) which in turn drives a hydraulic motor (not shown). The hydraulic motor may be operatively connected to the drive wheels 14 and the tracks 15. Operation of the hydraulic systems, and thus the drive wheels 14 and tracks 15, may be controlled by a control system including a controller 30.

Machine 10 includes a cab 26 from which an operator may provide input to control the machine. Cab 26 includes one or more input devices from which the operator issues commands. The operator may issue commands to control the propulsion and steering of the machine 10 as well as operate various implements associated with the machine. In some situations, it may be desirable to utilize automated controls to assist or override commands issued by the operator.

Machine 10 is equipped with a plurality of sensors that provide data indicative (directly or indirectly) of the difference between the speed (or change in speed) of the tracks 15 and the speed (or the change in speed) of the machine 10. A drive sensor such as a drive speed measurement sensor 32 may be provided on machine 10. The drive signal generated by the drive speed measurement sensor 32 is indicative of the speed of the ground-engaging traction device or track 15 relative to the machine 10. In other words, the drive signal indicates how fast the track 15 is moving on machine 10. Drive speed measurement sensor 32 may be a magnetic sensor on a hydraulic motor (not shown) which is used to drive the drive wheel 14 and thus cause track 15 to rotate. As described in more detail below, controller 30 converts the drive signal from the drive speed measurement sensor 32 into a "track" acceleration which is a measurement of the acceleration of the track 15.

A first sensor 33 such as a 3-axis accelerometer may be provided on the machine 10. The first sensor 33 may be used to provide an acceleration signal indicative of the measured acceleration of the machine 10. A second sensor 34 such as a pitch rate sensor (e.g., gyroscope) may also be provided on the machine 10. The second sensor 34 may be used to provide a pitch rate signal indicative of a measured pitch rate of the machine 10. As the machine 10 moves, the measured pitch rate will be indicative of the rate of change of the pitch angle of the machine 10. First sensor 33 and second sensor 34 may be mounted on the blade 16 or other locations on the machine 10. As described in more detail below, controller 30 converts the acceleration signal from first sensor 33 and the pitch rate signal from the second sensor 34 into a "ground" acceleration which is an approximation of the acceleration of the machine 10 along the ground or generally parallel to centerline 24 of the machine.

A control system may be provided to control the operation of the machine 10 in an efficient manner. The control system may include an electronic control module or controller 30. The controller 30 may receive operator input command signals and control the operation of the hydraulic systems that operate the drive wheels 14 and thus tracks 15. The control system may include one or more input devices to control the machine 10 and one or more sensors, including drive speed measurement sensor 32, first sensor 33 and second sensor 34, to provide data and other input signals representative of various operating parameters of the machine 10.

The controller 30 may be an electronic controller that operates in a logical fashion to perform operations, execute control algorithms, store and retrieve data and other desired operations. The controller 30 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 30 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 30 may be implemented in hardware and/or software without regard to the functionality. The controller 30 may rely on one or more data maps relating to the operating conditions of the machine 10 that may be stored in the memory of controller. Each of these maps may include a collection of data in the form of tables, graphs, and/or equations. The controller 30 may use the data maps to maximize the efficiency of the machine 10.

The control system and sensors may be configured to operate as a traction control system for the ground-engaging traction device. In doing so, the controller 30 may be configured to receive as an input value a predetermined speed or "slip speed" above which no slip of the ground-engaging traction device is expected to occur. It should be noted that during normal operation in which no track or wheel slippage is perceived by the operator, a small or threshold amount of slippage between the track 15 and ground may be occurring. This threshold amount of slippage may be approximately five to ten percent and, as used herein, refers to the situation in which the drive acceleration and the ground acceleration are equal or substantially equal. In other words, a small amount of slippage is not to be deemed a situation in which the drive acceleration is greater than the ground acceleration and thus the track speed is greater than the ground speed.

During the operation of the machine 10, as described in more detail below, the traction control system may modify the slip speed up or down based upon data generated during each monitoring cycle of the controller 30. In addition, a "slip factor" may be generated and used to modify an operator input command to reduce the speed of the ground-engaging traction device. The slip factor may be a percentage from zero to one hundred so that any value of the slip factor less than one hundred will cause a reduction in the speed command sent to the tracks 15 as compared to the desired input as indicated by the operator input command.

Machine 10 may be equipped with a user switch (not shown) to activate or deactivate the traction control aspect of the control system. If the traction control system is deactivated, machine 10 will operate in accordance with the operator's commands regardless of the operating conditions encountered by the machine, e.g., a slip condition.

Figure 2:
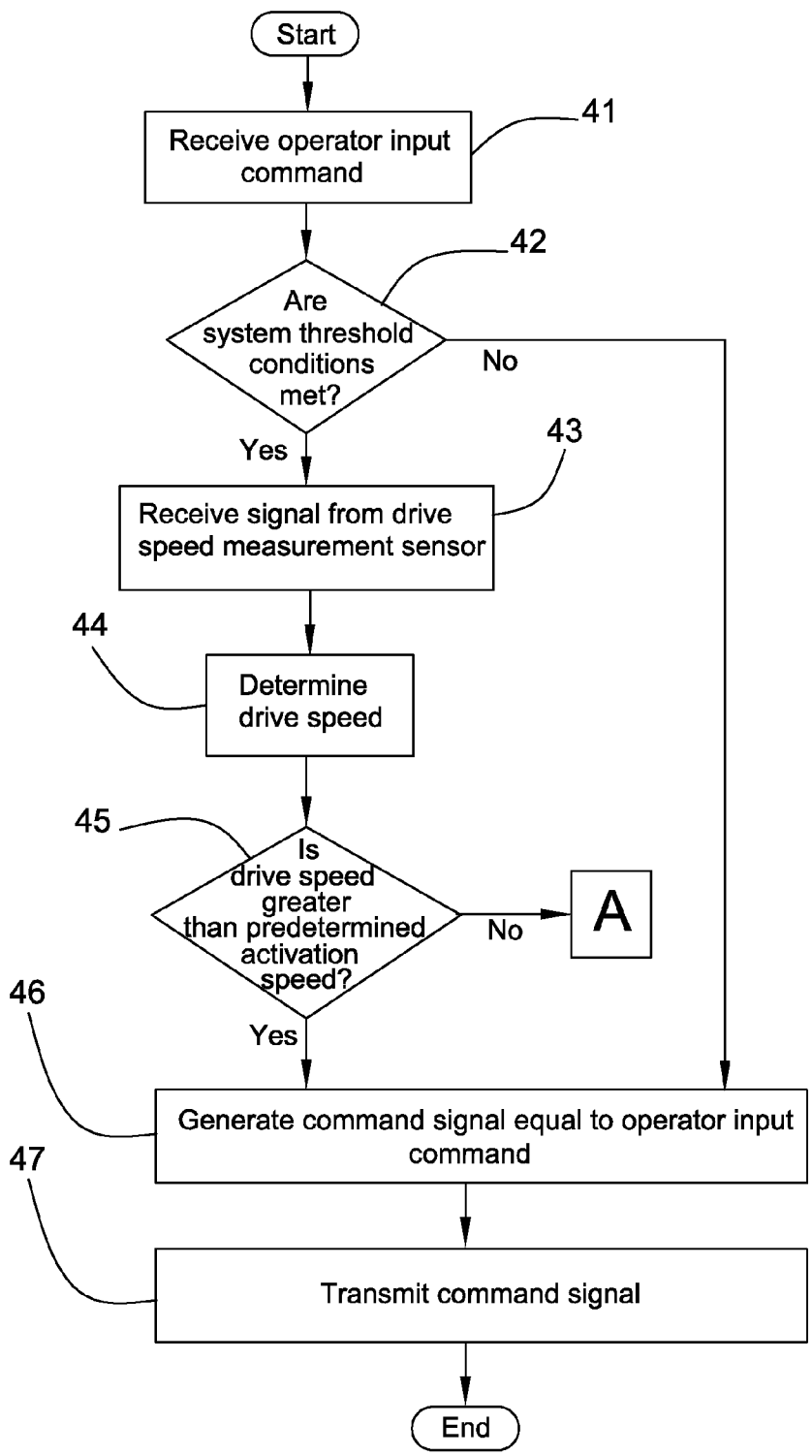
FIG. 2 shows a flowchart illustrating a traction control process in accordance with the disclosure.
Figure 3:
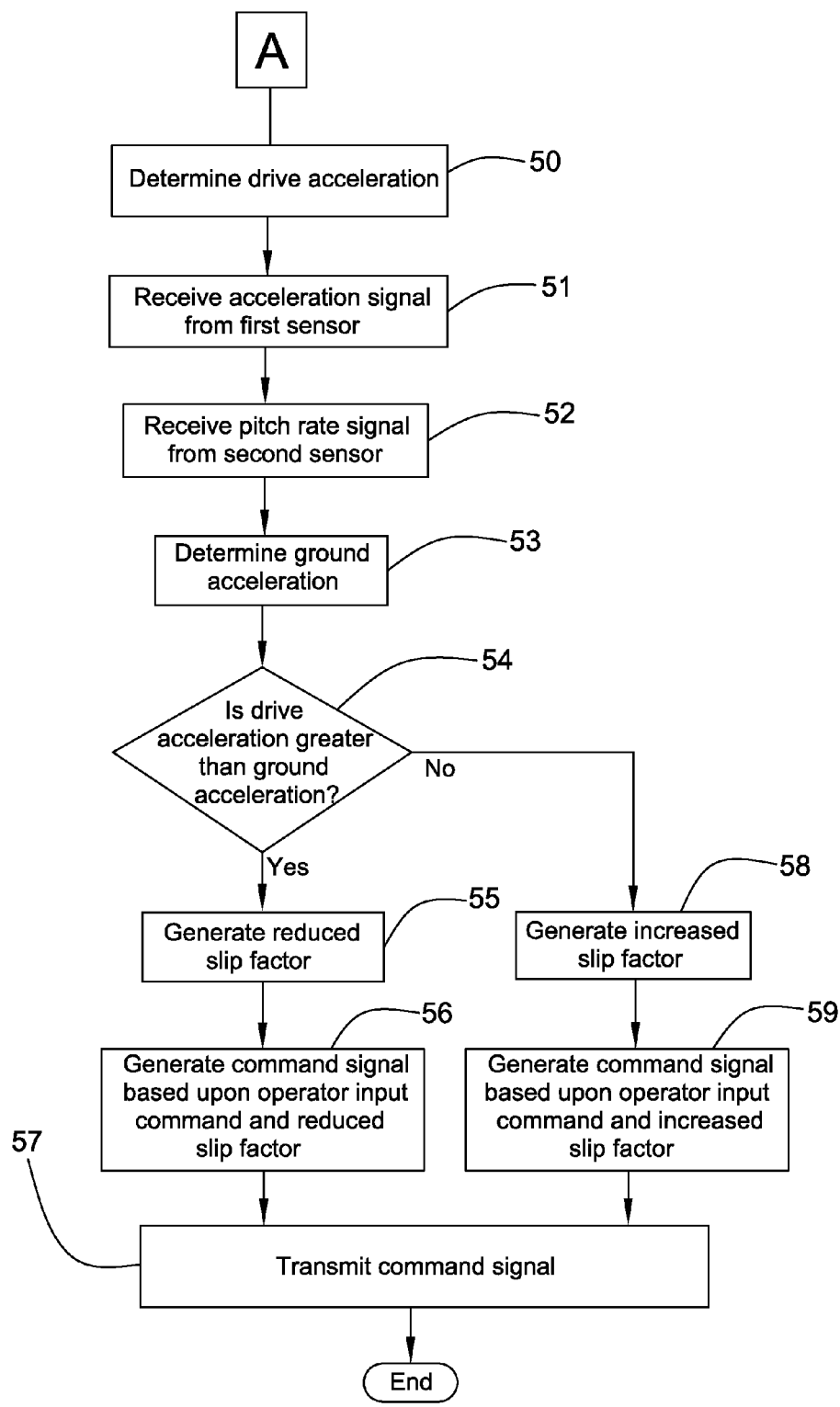
FIG. 3 shows a flowchart illustrating a further aspect of the traction control process of FIG. 2.

If the user switch is activated, the system will operate as depicted in the flowcharts of FIGS. 2-3. The operator provides an operator input command for propelling the machine 10 in either a forward or rearward direction at stage 41. At stage 42, the controller determines whether certain predetermined threshold conditions have been met to activate the traction control system. One threshold condition may be that the engine 13 is operating above a predetermined speed. If the engine 13 is operating below the predetermined speed, it may be desirable to deactivate the traction control system as the likelihood of actual slippage of the tracks 15 may be relatively small.

Another threshold condition may be that the load on the engine 13 is less than a predetermined level. The load on the engine 13 may be determined by the controller 30 based upon operating conditions of the engine including fuel consumption and operating speed. It may be desirable to deactivate the traction control system when the load is below the predetermined level as track slippage is more likely to occur at full load operating conditions and is less likely to occur at low load operating conditions. Another threshold condition may be a sensor quality check at which predetermined initialization and operating conditions of the sensors must be met. Still another threshold condition may be the speed at which the machine is travelling. If the machine is travelling at greater than a predetermined rate, the traction control system may be deactivated as it is unlikely for track slippage to occur when the machine is travelling above the predetermined rate. Another threshold condition may be based upon receipt of predetermined steering commands. For example, a machine 10 that includes a pair of tracks 15 may have one track moving faster than the other tracks during certain turning operations. It should be noted that the various threshold conditions may be different depending upon whether the machine 10 is being commanded to operate in a forward or reverse direction. Other threshold conditions may be set within the control system as desired.

If the necessary threshold conditions have not been met at stage 42, the controller 30 will generate a command signal generally equal to the operator input command signal at stage 46. In other words, the controller will not implement the functionality of the traction control system and a command signal generally equal to the operator input command signal will be transmitted at stage 47 to the drive system to control the ground-engaging traction device.

If, on the other hand, the necessary threshold conditions have been met at stage 42, the controller receives at stage 43 a drive signal from the drive speed measurement sensor 32 that is indicative of the speed of the tracks 15. The controller then determines the actual or drive speed of the tracks at stage 44. If the drive speed is greater than a predetermined maximum activation speed, the controller generates at stage 45 a command signal equal to the operator input command signal at stage 46. The predetermined maximum activation speed may be equal to or greater than the slip speed. At stage 47, the command signal is transmitted to the drive system to control the ground-engaging traction device.

If the drive speed is less than the predetermined maximum activation speed, process "A" according to FIG. 3 may be followed. The drive acceleration is determined at stage 50 based upon the drive signal generated by the drive speed measurement sensor 32. In doing so, the drive speed determined from the drive signal received at stage 43 is differentiated by controller 30 at stage 50 to calculate the drive acceleration. The drive acceleration may also be scaled by the controller 30 if desired.

At stage 51, the acceleration signal is received by the controller 30 from the first sensor 33. At stage 52, the pitch rate signal is received by the controller 30 from the second sensor 34. The ground acceleration or the acceleration of the machine 10 is determined at stage 53. During such calculation, the acceleration signal from the first sensor 33 may be filtered such as by high pass filtering. The pitch rate signal from the second sensor 34 may be filtered such as by low and high pass filtering. In addition, the pitch rate signal may be integrated. The filtered acceleration signal and the filtered and integrated pitch rate signal are then added together to generate an approximation of the actual machine or ground acceleration along the ground and generally parallel to centerline 24 as depicted in FIG. 1. By using the acceleration signal from the first sensor 33 and the pitch rate signal from the second sensor 34, the system compensates for the effects of gravity as well as the response rate differences between the first sensor 33 and the second sensor 34.

Figure 4:
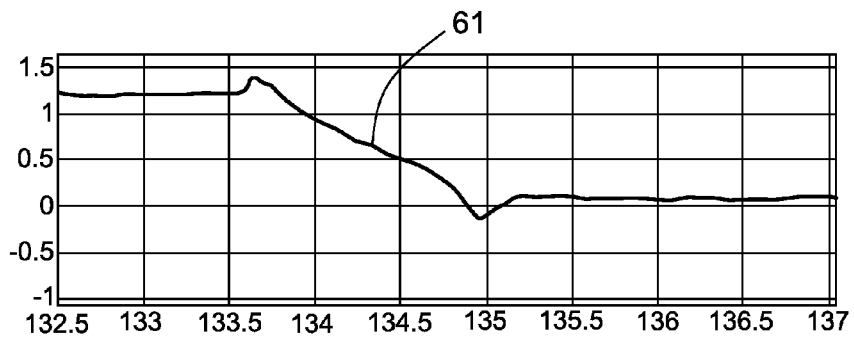
FIG. 4 is an exemplary performance graph of the signal from an accelerometer used with the present disclosure.
Figure 5:
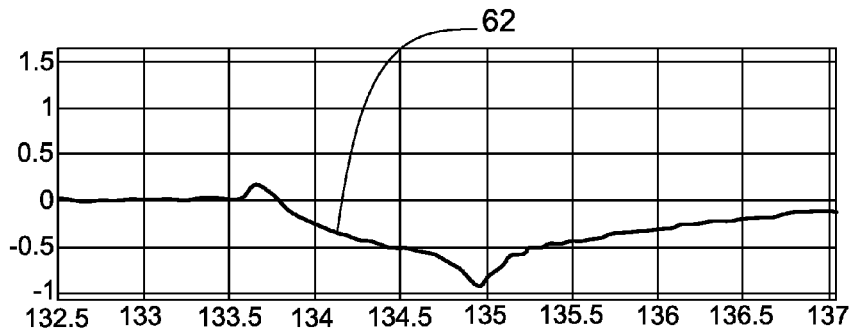
FIG. 5 is an exemplary performance graph of the signal of FIG. 4 after being filtered.
Figure 6:
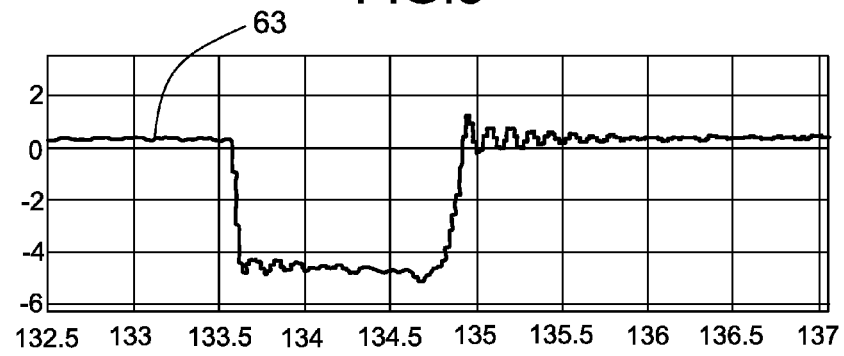
FIG. 6 is an exemplary performance graph of the signal from a pitch rate sensor used with the present disclosure.
Figure 7:
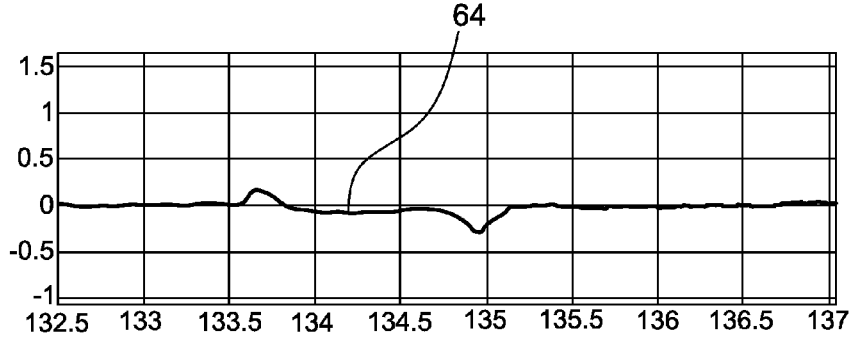
FIG. 7 is an exemplary performance graph of an estimate of the ground acceleration generated through the use of the signals of FIGS. 5-6.

Referring to FIG. 4, a graph of the acceleration signal 61 from the first sensor 33 is depicted. The graph depicts the acceleration signal denoted by a line 61 from the first sensor 33 as a function of time for a simulated movement of the machine 10 up a hill or incline. In FIG. 5, the acceleration signal of FIG. 4 is denoted at a line 62 after it has undergone filtering. FIG. 6 depicts the pitch rate signal denoted by a line 63 from the second sensor 34. The graph depicts the pitch rate signal 63 from the second sensor 34 as a function of time for the same simulated movement of the machine 10 as FIGS. 4-5. FIG. 7 depicts the estimated ground acceleration denoted by a line 64 of machine 10 along centerline 24 generated by the controller 30. The estimated ground acceleration 64 is produced by summing the filtered acceleration signal 62 of FIG. 5 and the pitch rate signal of FIG. 6 after it has been filtered, scaled and integrated. It can be seen from FIGS. 4-7 that the sum of the signals from the first sensor 33 and the second sensor 34 permits the elimination or reduction of errors in the present system due to the affect of gravity on the sensors as machine 10 encounters hills.

Turning back to FIG. 3, at stage 54, the drive acceleration is compared to the ground acceleration. If the drive acceleration is sufficiently greater than the ground acceleration, the control system 30 determines that the track 15 is slipping relative to the ground. The controller 30 then operates to reduce the speed of the tracks 15. In order to do so, the controller reduces the slip factor at stage 55. Thus, the slip factor is reduced for each operating cycle of the controller 30 in which the drive acceleration is greater than the calculated ground acceleration as this condition indicates that the tracks 15 are slipping relative to the ground. At stage 56, a command signal is generated based upon the operator input command signal and the reduced slip factor. As such, the command signal is at least in part based upon the reduced slip factor and the operator input command signal. As the tracks 15 slip, each operating cycle of the controller 30 results in a reduction of the slip factor. In one example, the controller may operate at a frequency of approximately 50 Hz. Accordingly, the slip factor may be reduced relatively quickly until the tracks 15 are no longer slipping. After the command signal is generated, it is transmitted at stage 57 to the drive system to control the ground-engaging traction device.

If the drive acceleration is greater than the ground acceleration, the system may be deemed to be "recovering" from the slippage. In such case, the controller 30 may increase the speed of the tracks 15 as well as the slip factor.

If the tracks 15 do not slip relative to the ground and the drive acceleration is not greater than the ground acceleration at stage 54, the slip factor is increased at stage 58. The command signal generated at stage 59 is based upon the operator input command signal and the increased slip factor. The command signal is then transmitted at stage 57 to the drive system to control the ground-engaging traction device.

By reducing the slip factor each time the drive acceleration is greater than the ground acceleration, the speed of the tracks 15 is reduced until eventually the speed has been sufficiently reduced so that the tracks 15 no longer slip and the drive acceleration is equal to or approximately equal to the ground acceleration. If desired, the controller may react to the slip factor differently at a plurality of different speeds and in forward and reverse directions so that the machine 10 may operate within a narrower range than if a single slip factor were used.

In operation, an operator will often perform a series of tasks over some period of time in a particular area having a generally consistent surface material. In order to improve the operation of the traction control system, the controller 30 may "learn" the characteristics of the surface material on which the machine is operating as well as the operating characteristics of the machine operator. This may be accomplished by recording, as a series of data points, the speeds at which slippage of the tracks 15 occurs. During each operating cycle, the controller compares the drive acceleration to the calculated ground acceleration. If the drive acceleration is greater than the ground acceleration, the tracks 15 are slipping relative to the ground. The controller 30 may reduce the slip factor each operating cycle until the drive acceleration is approximately equal to the ground acceleration and no slippage is occurring. The controller 30 may record the speed of the tracks 15 and use such data to predict or anticipate track speeds at which slip events might occur.

The track speed at which the slip events have occurred may be used to calculate a new slip speed. As the operator continues to operate the machine 10, the controller 30 may utilize the additional data from each slip event by averaging the new slip speed with the previously set or previously calculated slip speed to generate a revised slip speed. In other words, the existing or predetermined slip speed is averaged with the track speed or the speed of the ground-engaging traction device when the drive acceleration is approximately equal to the ground acceleration. This slip speed may be used until the machine 10 is turned off or the traction control system is turned off. In some situations, the controller may be configured so that slip speed will return to the original or preset slip speed if the machine idles in a particular position. If desired, the controller may utilize different slip speeds in forward and reverse.

INDUSTRIAL APPLICABILITY

The industrial applicability of the system described herein will be readily appreciated from the foregoing discussion. The foregoing discussion is applicable to self-propelled machines that have a ground-engaging traction device such as tracks 15 or wheels. The traction control system compares the speed of the ground-engaging traction device to a ground speed of the machine 10 to determine whether slippage is occurring. This is accomplished by comparing the acceleration of the tracks 15 to the acceleration of the machine 10. If the tracks 15 are accelerating substantially more than the machine 10, the tracks 15 are slipping relative to the ground.

In one aspect, a system for automated control of a ground-engaging traction device of a machine 10 includes a plurality of sensors. A drive sensor 32 is configured to provide a drive signal indicative of a speed of the ground-engaging traction device. A first sensor 33 on the machine 10 is configured to provide an acceleration signal indicative of a measured acceleration of the machine. A second sensor 34 on the machine 10 is configured to provide a pitch rate signal indicative of a measured pitch rate of the machine. A controller 30 is configured to determine a drive acceleration based upon the drive signal, and a ground acceleration based upon the acceleration signal and the pitch rate signal. The controller further is configured to compare the drive acceleration to the ground acceleration, determine a command signal at least in part based upon an operator input command signal and a difference between the drive acceleration and the ground acceleration, and transmit the command signal to a drive system to control the ground-engaging traction device.

In another aspect, a method for controlling a ground-engaging traction device of a machine 10 is provided. The method includes receiving a drive signal at a controller 30 indicative of a speed of the ground-engaging traction device, receiving an acceleration signal at the controller 30 indicative of a measured acceleration of the machine 10, and receiving a pitch rate signal at the controller 30 indicative of a measured pitch rate of the machine. A drive acceleration is determined based upon the drive signal, and a ground acceleration is determined based upon the acceleration signal and the pitch rate signal. The drive acceleration is compared to the ground acceleration. A command signal is determined at least in part based upon an operator input command signal and a difference between the drive acceleration and the ground acceleration. The command signal is transmitted from the controller 30 to a drive system to control the ground-engaging traction device.

It will be appreciated that the foregoing description provides examples of the disclosed system and technique. In this regard, the disclosed system may employ speed and acceleration sensors that are already disposed on the machine for use in other control functions. However, it is contemplated that other implementations of the disclosure may differ in detail from the foregoing examples. That is, other speed and/or acceleration sensors may be employed to derive (either directly or indirectly) a machine acceleration and an expected machine acceleration that may then be used to determine track slippage. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for automated control of a ground-engaging traction device of a machine having a drive system, the traction device engaging a ground surface, the system comprising:
 a drive sensor configured to provide a drive signal indicative of a speed of the ground-engaging traction device;
 a first sensor configured to provide an acceleration signal indicative of a measured acceleration of the machine;
 a second sensor configured to provide a pitch rate signal indicative of a measured pitch rate of the machine; and
 a controller configured to:
  determine a drive acceleration based upon the drive signal;
  determine a ground acceleration based upon the acceleration signal and the pitch rate signal, the ground acceleration being parallel to the ground surface;
  compare the drive acceleration to the ground acceleration;
  determine a command signal at least in part based upon an operator input command signal and a difference between the drive acceleration and the ground acceleration; and
  transmit the command signal to the drive system to control the ground-engaging traction device.

2. The system for automated control of a ground-engaging traction device of claim 1, wherein the drive acceleration is determined by differentiating the drive signal.

3. The system for automated control of a ground-engaging traction device of claim 1, wherein the command signal is equal to the operator input command signal if an operator issues a predetermined steering command.

4. The system for automated control of a ground-engaging traction device of claim 1, wherein the command signal is equal to the operator input command signal if a prime mover is operating above a predetermined speed.

5. The system for automated control of a ground-engaging traction device of claim 1, wherein the command signal is equal to the operator input command signal if a load on a prime mover is less than a predetermined level.

6. The system for automated control of a ground-engaging traction device of claim 1, wherein the command signal is determined at least in part based upon data including the speed of the ground-engaging traction device when the drive acceleration is greater than the ground acceleration.

7. The system for automated control of a ground-engaging traction device of claim 1, wherein the drive sensor measures a speed of a motor operatively associated with the ground-engaging traction device.

8. The system for automated control of a ground-engaging traction device of claim 1, wherein the command signal is equal to the operator input command signal if the speed of the ground-engaging traction device is greater than a predetermined maximum activation speed, the maximum activation speed being at least as high as a predetermined slip speed.

9. The system for automated control of a ground-engaging traction device of claim 8, wherein the predetermined slip speed is averaged with the speed of the ground-engaging traction device when the drive acceleration is approximately equal to the ground acceleration.

10. The system for automated control of a ground-engaging traction device of claim 1, wherein the ground acceleration is determined in part by integrating the pitch rate signal.

11. The system for automated control of a ground-engaging traction device of claim 1, wherein the command signal is less than the operator input command signal if the drive acceleration is greater than the ground acceleration.

12. A system for automated control of a ground-engaging traction device of a machine having a drive system, the traction device engaging a ground surface, the system comprising:
- a drive sensor configured to provide a drive signal indicative of a speed of the ground-engaging traction device;
- a first sensor configured to provide an acceleration signal indicative of a measured acceleration of the machine;
- a second sensor configured to provide a pitch rate signal indicative of a measured pitch rate of the machine; and
- a controller configured to:
  - determine a drive acceleration based upon the drive signal;
  - determine a ground acceleration based upon the acceleration signal and the pitch rate signal, the ground acceleration being parallel to the ground surface;
  - compare the drive acceleration to the ground acceleration;
  - generate a slip factor based upon a difference between the drive acceleration and the ground acceleration;
  - determine a command signal at least in part based upon an operator input command signal, the slip factor, and a difference between the drive acceleration and the ground acceleration; and
  - transmit the command signal to the drive system to control the ground-engaging traction device.

13. The system for automated control of a ground-engaging traction device of claim 12, wherein the slip factor is increased if the drive acceleration is approximately equal to the ground acceleration.

14. A method for controlling a ground-engaging traction device of a machine having a drive system, the traction device engaging a ground surface, the method comprising:
- receiving a drive signal at a controller indicative of a speed of the ground-engaging traction device;
- receiving an acceleration signal at the controller indicative of a measured acceleration of the machine;
- receiving a pitch rate signal at the controller indicative of a measured pitch rate of the machine;
- determining a drive acceleration based upon the drive signal;
- determining a ground acceleration based upon the acceleration signal and the pitch rate signal, the ground acceleration being parallel to the ground surface;
- comparing the drive acceleration to the ground acceleration;
- determining a command signal at least in part based upon an operator input command signal and a difference between the drive acceleration and the ground acceleration; and
- transmitting the command signal from the controller to the drive system to control the ground-engaging traction device.

15. The method for controlling a ground-engaging traction device of a machine of claim 14, further including receiving at the controller a predetermined steering command and setting the command signal equal to the operator input command signal.

16. The method for controlling a ground-engaging traction device of a machine of claim 14, further including receiving at the controller a signal that a prime mover is operating above a predetermined speed and setting the command signal equal to the operator input command signal.

17. The method for controlling a ground-engaging traction device of a machine of claim 14, further including receiving at the controller a signal that a load on a prime mover is less than a predetermined level and setting the command signal equal to the operator input command signal.

18. The method for controlling a ground-engaging traction device of a machine of claim 14, further including differentiating the drive signal to determine the drive acceleration.

19. The method for controlling a ground-engaging traction device of a machine of claim 14, further including measuring a speed of a motor operatively associated with the ground-engaging traction device.

20. The method for controlling a ground-engaging traction device of a machine of claim 14, further including receiving at the controller a signal that the speed of the ground-engaging traction device is greater than a predetermined maximum activation speed and setting the command signal equal to the operator input command signal.

* * * * *